Figure 1:
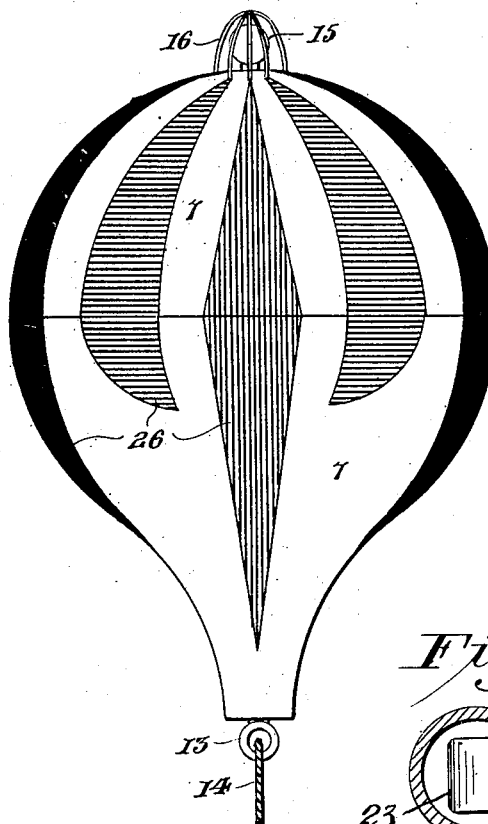

M. S. ZAPPEY.
WRECK INDICATING BUOY.
APPLICATION FILED OCT. 6, 1920.

1,377,046. Patented May 3, 1921.

Inventor
M. S. Zappey ent in the novel form, combination and arrangement of parts hereinafter

UNITED STATES PATENT OFFICE.

MICHAEL S. ZAPPEY, OF JOHNSTOWN, PENNSYLVANIA.

WRECK-INDICATING BUOY.

1,377,046. Specification of Letters Patent. Patented May 3, 1921.

Application filed October 6, 1920. Serial No. 414,989.

*To all whom it may concern:*

Be it known that I, MICHAEL S. ZAPPEY, a citizen of Czecho-Slovakia, residing at Johnstown, in the county of Cambria and State of Pennsylvania, have invented certain new and useful Improvements in Wreck-Indicating Buoys, of which the following is a specification.

This invention relates to certain new and useful improvements in wreck indicating buoys and has for its object primarily to provide a device of this kind of such simple and durable construction and capable of such efficient operation as to meet with all the requirements for a successful use.

The invention broadly consists of a somewhat balloon-shaped float formed of buoyant material in a special manner and composed of upper and lower sections detachably connected and chambered to contain batteries, the upper section being provided with an exposed electric lamp with means to open or close a circuit including said lamp and said batteries manually when desired, and the float being provided with means whereby the device may be connected with the deck of a ship in the usual manner by means of a cable or the like.

Other objects will appear as the nature of the invention is better understood and the same consists in the novel form, combination and arrangement of parts hereinafter more fully described in connection with the accompanying drawings, in which like reference characters indicate similar parts throughout the several views.

Figure 2:
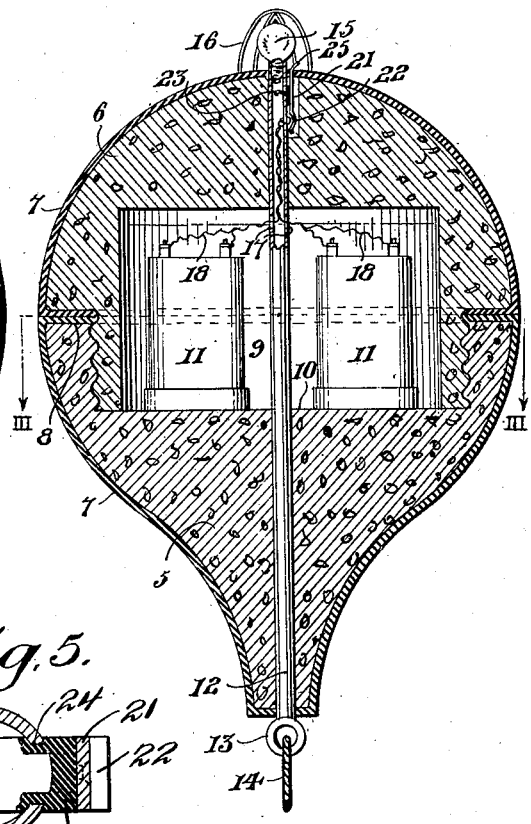
Figure 5:
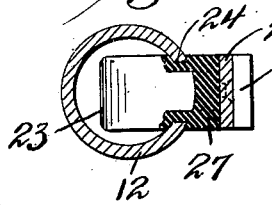
Figure 3:
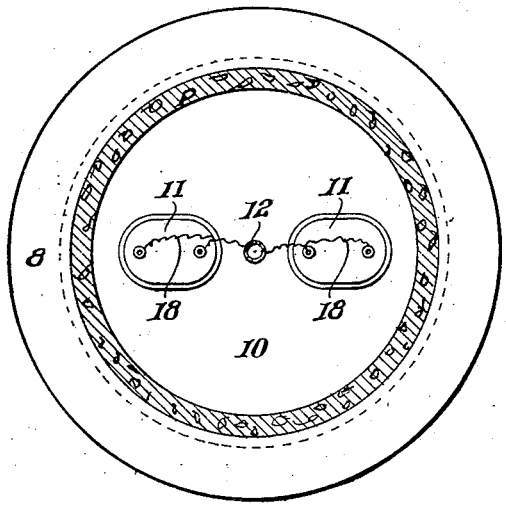
Figure 4:
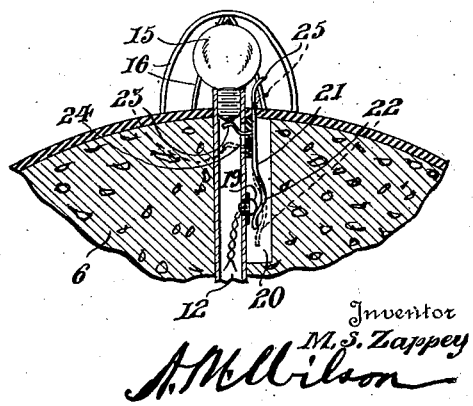

In the drawings,

Figure 1 is an elevational view of a buoy constructed in accordance with the present invention, Fig. 2 is a substantially central vertical sectional view thereof, partly broken away, Fig. 3 is a horizontal sectional view taken substantially upon line III—III of Fig. 2, Fig. 4 is an enlarged detail view of the upper portion of the device shown in Fig. 2 to more clearly show details of construction, and Fig. 5 is an enlarged detail view showing the axial tube and the movable contact member in transverse section.

Referring more in detail to the several views, the present invention embodies a somewhat balloon-shaped float formed of cork or equivalent material and composed of a lower female section 5 having threaded connection with an upper male section 6, the two sections being covered by a serviceable shell 7 also formed in sections and composed of hard vulcanized rubber or sheet metal whereby the device is made more durable. The sections of the shell 7 snugly fit the float members 5 and 6 and extend between the latter as at 8 so as to form a packing at the joint between the two sections 5 and 6 when said shell is made of rubber.

The two sections 5 and 6 are provided with central mating pockets which combine to form a suitable chamber 9 when the two sections are connected, said chamber being provided with a flat bottom wall 10 so as to permit of the placement of a pair of battery cells 11 thereon, which cells are immovably secured to the section 5 in any desired manner if preferred.

A tube 12 extends axially through the sections 5 and 6 and is provided at its lower end with an eye 13 exteriorly of the float for enabling a cable 14 to be readily attached in the usual manner for flexibly connecting the buoy to the deck of the vessel. The upper end of the tube 12 is interiorly threaded for detachable reception of the base of an electric lamp 14, and the upper float section 6 carries an exterior rigid cage 16 which incloses said lamp so as to protect the latter against damage. The tube 12 is slotted as at 17 to permit passage of the wires 18 from the batteries 11 to the interior of said tube, certain of said wires being connected in the proper manner to the tube 12 and others of the same being attached to a contact 19 which is secured to and insulated from the tube 12 adjacent the upper end of the latter. As shown, the upper section 6 is recessed as at 20 and the contact 19 projects into said recess. A movable contact member 21 is vertically slidable in the recess 20 and is provided with a curved lower end 22 arranged to engage the contact 19 when said movable contact 21 is elevated as shown in Fig. 4 and to lie spaced from the contact 19 when lowered as shown in Fig. 2. A spring contact arm 23 is rigid with the contact member 21 and extends inwardly through a vertically elongated slot 24 of the tube 12 so as to engage the central contact of the lamp 15 when said contact member 21 is in raised position and so as to be spaced from said central contact when said member 21 is lowered as shown in Fig. 2, the contact member 21 being suitably insulated as at 27 from the tube 12 and held to the latter as shown in Fig. 5. The upper end of the contact member 21 slidably extends through the upper section of the shell 7 and is formed to provide a finger piece 25 by means of which said contact member 21 may be moved from circuit making to circuit breaking position or vice versa.

As shown in Fig. 1, the float may be exteriorly painted or decorated as at 26 in brilliant colors for insuring the attraction of the attention of rescuers, which brilliant colors will be seen in the daytime and also at night when the lamp 15 is lighted.

In operation, should wrecking of a vessel occur, an attendant may raise the movable contact member 21 from the position of Fig. 2 to the position of Fig. 4, whereupon the lamp 15 is lighted. As the vessel sinks, the float is allowed to stay upon the surface of the water upon paying out of the cable 14 in any preferred or usual manner, thus providing a permanent indication of a wreck occurring near the point where the float is located. The float is made in sections in order to permit ready access to the various parts such as the wiring and batteries and to enable renewal of parts.

From the foregoing description, it is believed that the construction and operation will at once be apparent.

Minor changes may be made in the invention without departing from the spirit and scope of the same as claimed.

What is claimed as new is:

1. A wreck indicating buoy including a float formed of upper and lower detachably connected sections having pockets forming a central closed chamber when the sections are connected, a tube extending axially through said sections and having an electric lamp detachably secured in its upper end, means upon the lower end of said tube for permitting ready attachment of a cable thereto whereby the float may be flexibly connected to the deck of a vessel, battery cells within said chamber having wires electrically connected to said tube, a contact fixed to and insulated from said tube and having other wires of said battery electrically connected thereto, and a vertically slidable contact member carried by the upper section arranged to provide electrical connection between said fixed contact and the central contact of the electric lamp when elevated, whereby a circuit is established for lighting said lamp.

2. A wreck indicating buoy including a float formed of upper and lower detachably connected sections having pockets forming a central closed chamber when the sections are connected, a tube extending axially through said sections and having an electric lamp detachably secured in its upper end, means upon the lower end of said tube for permitting ready attachment of a cable thereto whereby the float may be flexibly connected to the deck of a vessel, battery cells within said chamber having wires electrically connected to said tube, a contact fixed to and insulated from said tube and having other wires of said battery electrically connected thereto, a vertically slidable contact member carried by the upper section arranged to provide electrical connection between said fixed contact and the central contact of the electric lamp when elevated, whereby a circuit is established for lighting said lamp, said lower and upper sections constituting female and male members having detachable threaded connection with each other, and a waterproof casing for said sections providing a packing between the joint of the same.

In testimony whereof I affix my signature.

MICHAEL S. ZAPPEY.